United States Patent

McKarge, Jr.

[11] Patent Number: 5,904,461
[45] Date of Patent: May 18, 1999

[54] LOCKING T-NUT

[76] Inventor: Gerald G. McKarge, Jr., 10233 Jordan Ave., Chatsworth, Calif. 91311

[21] Appl. No.: 09/074,152

[22] Filed: May 7, 1998

[51] Int. Cl.$^6$ .............................. F16B 39/34; F16B 37/04
[52] U.S. Cl. ........................... 411/302; 411/180; 411/427
[58] Field of Search ..................................... 411/302, 303, 411/304, 176, 180, 182, 427, 369

[56] References Cited

U.S. PATENT DOCUMENTS

| | | | |
|---|---|---|---|
| 180,064 | 7/1876 | Rebasz | 411/303 |
| 1,893,067 | 1/1933 | Arenz | 411/304 |
| 2,321,497 | 6/1943 | Luce | 411/303 |
| 3,358,727 | 12/1967 | Hughes | 411/180 |
| 3,403,718 | 10/1968 | Hughes | 411/180 |
| 5,391,031 | 2/1995 | Medal | 411/180 |

FOREIGN PATENT DOCUMENTS 2505216  8/1976  Germany ................ 411/302

*Primary Examiner*—Flemming Saether

[57] ABSTRACT

A new locking T-nut for securely fastening a threaded element, such as a threaded bolt, to a structure. The inventive device includes a cylindrical nut body with a threaded bore extending therethough. Within the bore, at least one resilient locking ring is mounted within an annular groove provided on the inner surface of the bore. A radial flange radially extends from the one end of the nut body and includes at least one securing tooth extending therefrom towards the other end of the nut body.

8 Claims, 4 Drawing Sheets

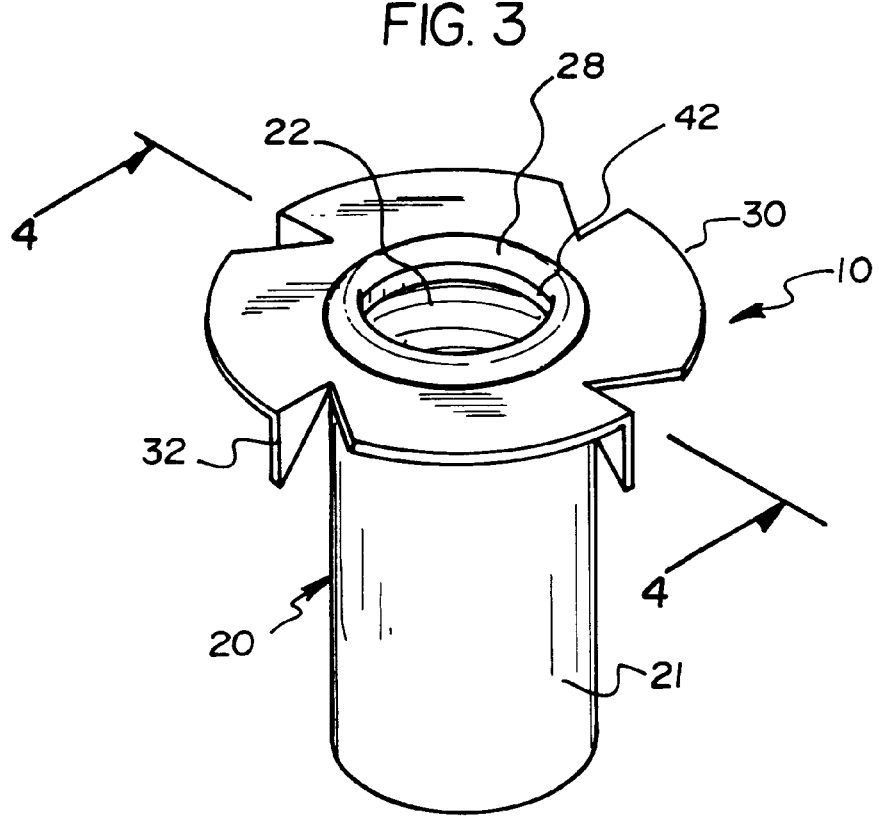
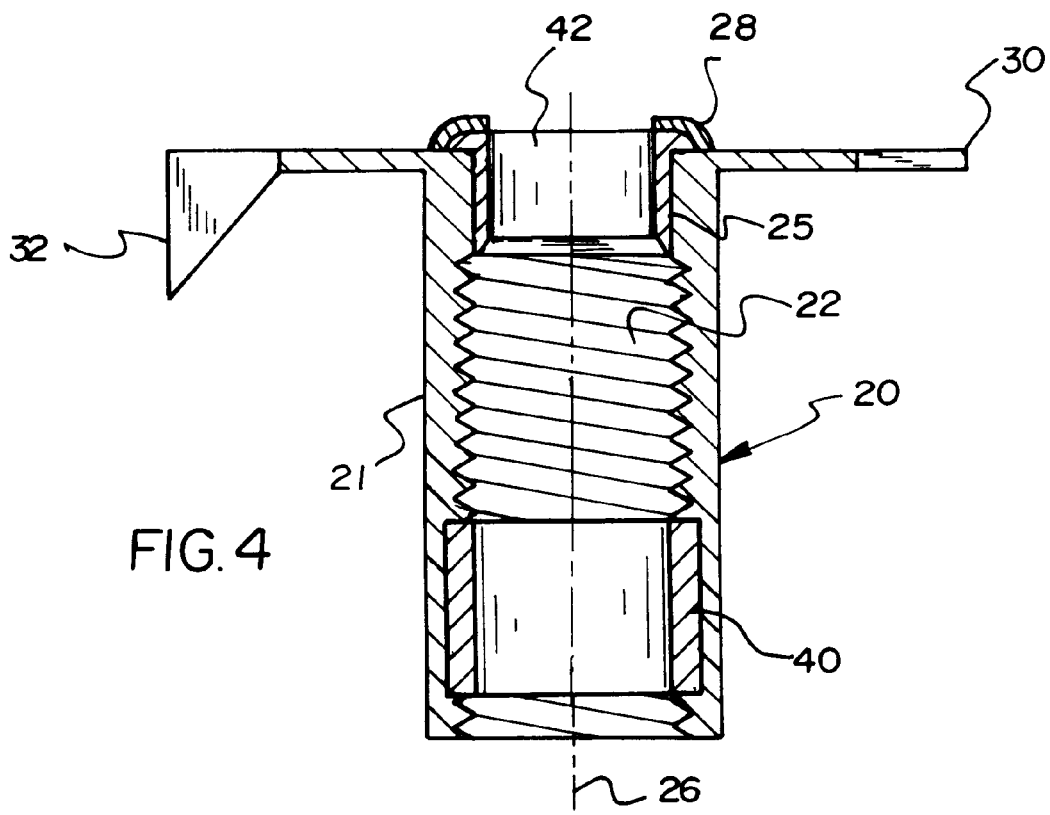

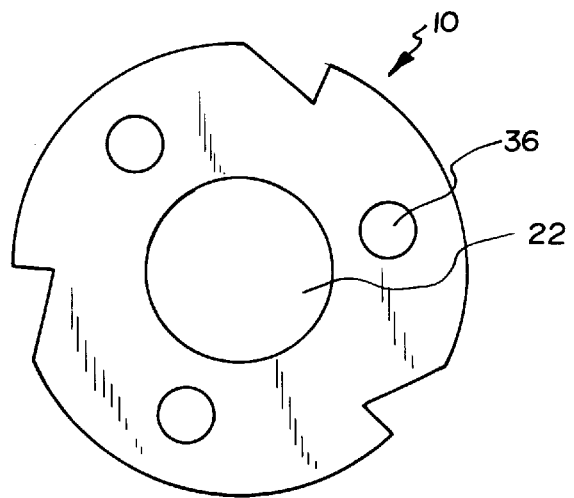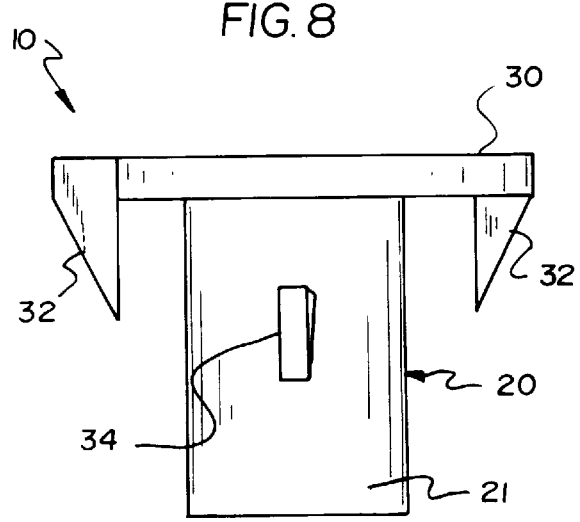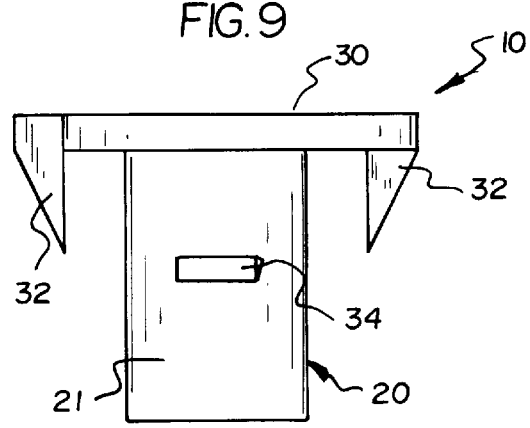

LOCKING T-NUT

BACKGROUND OF THE INVENTION

1. Field of the Invention

The present invention relates to lock nuts and more particularly pertains to a new locking T-nut for securely fastening a threaded element, such as a threaded bolt, to a structure.

2. Description of the Prior Art

The use of lock nuts is known in the prior art. More specifically, lock nuts heretofore devised and utilized are known to consist basically of familiar, expected and obvious structural configurations, notwithstanding the myriad of designs encompassed by the crowded prior art which have been developed for the fulfillment of countless objectives and requirements.

Known prior art lock nuts include U.S. Pat. Nos. 4,004, 626; 5,391,003; 4,126,170; 4,019,550; 4,993,902; and 3,952,785.

While these devices fulfill their respective, particular objectives and requirements, the aforementioned patents do not disclose a new locking T-nut. The inventive device includes a cylindrical nut body with a threaded bore extending therethough. Within the bore, at least one resilient locking ring is mounted within an annular groove provided on the inner surface of the bore. A radial flange radially extends from the one end of the nut body and includes at least one securing tooth extending therefrom towards the other end of the nut body.

In these respects, the locking T-nut according to the present invention substantially departs from the conventional concepts and designs of the prior art, and in so doing provides an apparatus primarily developed for the purpose of securely fastening a threaded element, such as a threaded bolt, to a structure.

SUMMARY OF THE INVENTION

In view of the foregoing disadvantages inherent in the known types of lock nuts now present in the prior art, the present invention provides a new locking T-nut construction wherein the same can be utilized for securely fastening a threaded element, such as a threaded bolt, to a structure.

The general purpose of the present invention, which will be described subsequently in greater detail, is to provide a new locking T-nut apparatus and method which has many of the advantages of the lock nuts mentioned heretofore and many novel features that result in a new locking T-nut which is not anticipated, rendered obvious, suggested, or even implied by any of the prior art lock nuts, either alone or in any combination thereof.

To attain this, the present invention generally comprises a cylindrical nut body with a threaded bore extending therethough. Within the bore, at least one resilient locking ring is mounted within an annular groove provided on the inner surface of the bore. A radial flange radially extends from the one end of the nut body and includes at least one securing tooth extending therefrom towards the other end of the nut body.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new locking T-nut apparatus and method which has many of the advantages of the lock nuts mentioned heretofore and many novel features that result in a new locking T-nut which is not anticipated, rendered obvious, suggested, or even implied by any of the prior art lock nuts, either alone or in any combination thereof.

It is another object of the present invention to provide a new locking T-nut which may be easily and efficiently manufactured and marketed.

It is a further object of the present invention to provide a new locking T-nut which is of a durable and reliable construction.

An even further object of the present invention is to provide a new locking T-nut which is susceptible of a low cost of manufacture with regard to both materials and labor, and which accordingly is then susceptible of low prices of sale to the consuming public, thereby making such locking T-nut economically available to the buying public.

Still yet another object of the present invention is to provide a new locking T-nut which provides in the apparatuses and methods of the prior art some of the advantages thereof, while simultaneously overcoming some of the disadvantages normally associated therewith.

Still another object of the present invention is to provide a new locking T-nut for securely fastening a threaded element, such as a threaded bolt, to a structure.

Yet another object of the present invention is to provide a new locking T-nut which includes a cylindrical nut body with a threaded bore extending therethough. Within the bore, at least one resilient locking ring is mounted within an annular groove provided on the inner surface of the bore. A radial flange radially extends from the one end of the nut body and includes at least one securing tooth extending therefrom towards the other end of the nut body.

Still yet another object of the present invention is to provide a new locking T-nut that solves the problem of the loosening of items secured to a structure by either a T-nut or a lock nut by combining a lock nut with a T-nut to include all the advantages of both types of nuts for securing an element to a structure so that the element and the locking T-nut are not easily loosened from the structure.

Even still another object of the present invention is to provide a new locking T-nut that helps to securely hold items, such as caster wheel assemblies, to a structure so that the items are not easily broken away from the structure from rugged usage of the structure.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be made to the accompanying drawings and descriptive matter in which there are illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 3 is a perspective view of an embodiment of the present invention.

FIG. 4 is a cross sectional view of an embodiment the present invention taken from line 4—4 on FIG. 3 showing an locking ring positioned towards the end of the nut body with the radial flange.

FIG. 7 is a top view of an embodiment of the present invention having securing holes in the radial flange.

FIG. 8 is a side view of an embodiment of the present invention with a vertical securing cleat.

FIG. 9 is a side view of an embodiment of the present invention with a horizontal securing cleat.

DESCRIPTION OF THE PREFERRED EMBODIMENT

Figure 1:
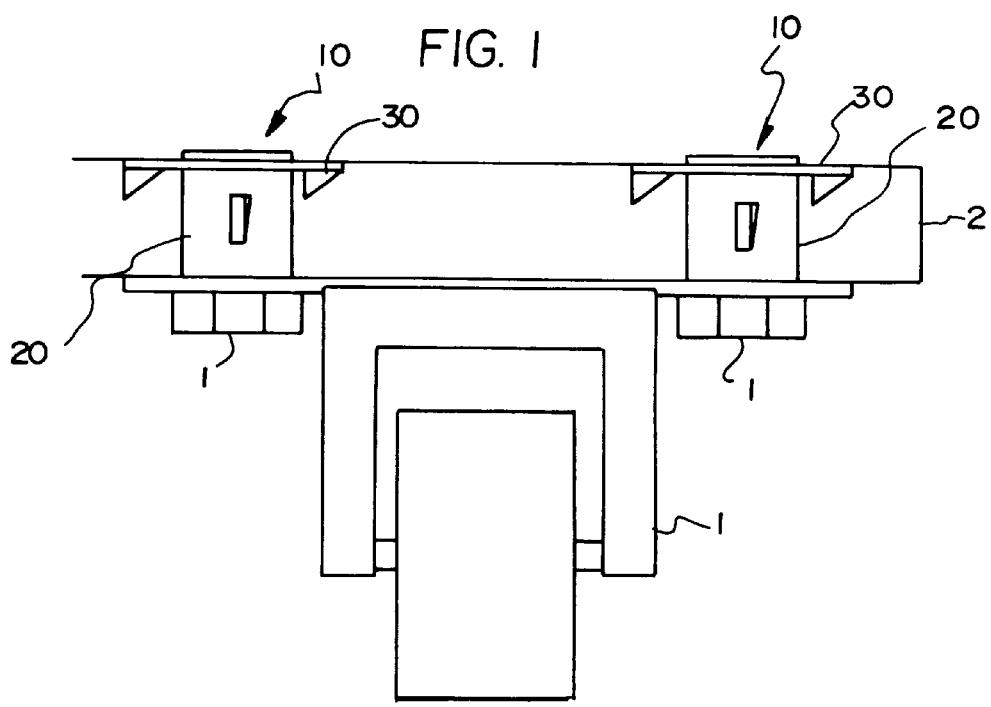
FIG. 1 is a side view of a new locking T-nut according to the present invention in use fastening the threaded attachment element of a caster wheel to a structure.
Figure 2:
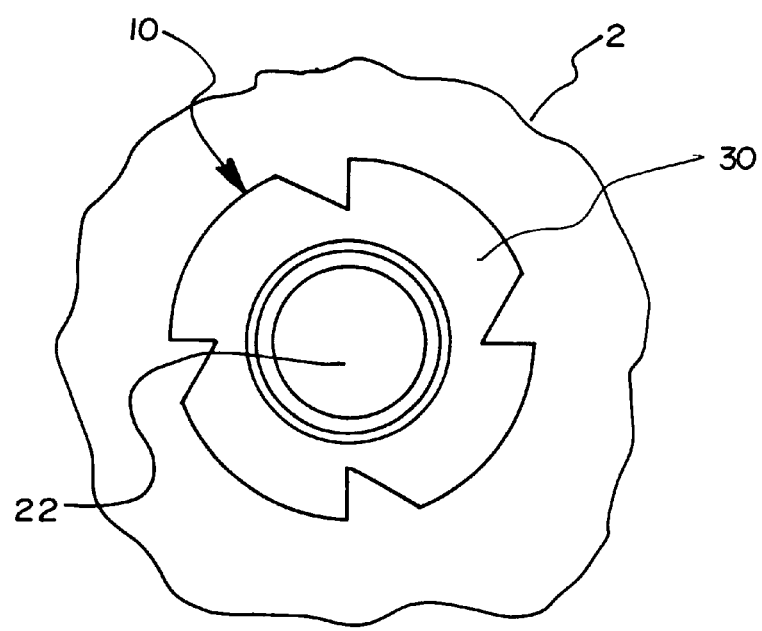
FIG. 2 is a top view of the present invention showing the radial flange end of the locking T-nut.

With reference now to the drawings, and in particular to FIGS. 1 through 9 thereof, a new locking T-nut embodying the principles and concepts of the present invention and generally designated by the reference numeral 10 will be described.

As best illustrated in FIGS. 1 through 9, the locking T-nut 10 generally comprises a cylindrical nut body 20 with a threaded bore 22 extending therethough. Within the bore 22, a resilient locking ring 40 is mounted within an annular groove 24 provided on the inner surface of the bore 22. A radial flange 30 radially extends from the one end of the nut body 20 and includes at least one securing tooth 32 extending therefrom towards the other end of the nut body 20.

The bore 22 extends through the nut body 20 along the longitudinal axis 26 of the nut body and through both ends of the nut body 20. The threaded bore 22 is adapted to receive and engage a threaded element 1 such as a threaded bolt.

Figure 5:
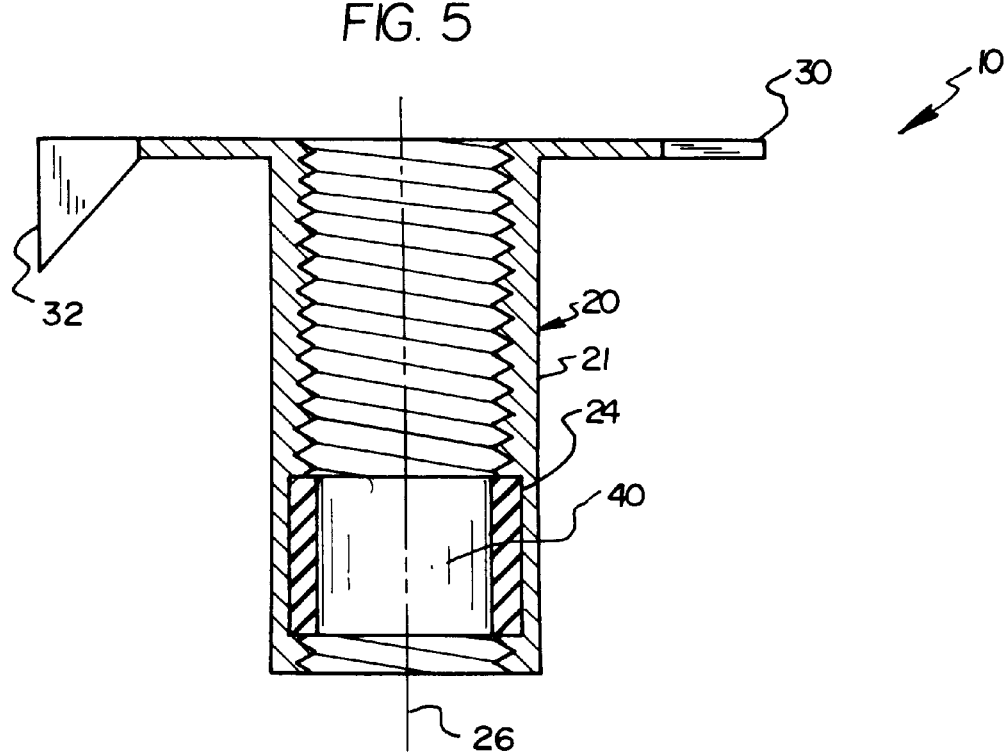
FIG. 5 is a cross sectional view of the embodiment of the present invention having a locking ring positioned towards the end of the nut body without the radial flange.

The annular groove 24 opens into the bore 22 so that it may receive the locking ring 40. The locking ring 40 is mounted within the annular groove 24 so that the locking ring 40 is in coaxial alignment with the bore 22. Generally, the annular groove 24 may be located anywhere along the length of the bore 22. In one preferred embodiment, as shown in FIG. 5, the annular groove is located towards the end of the nut body 20 opposite end with the radial flange 30.

FIG. 4 illustrates an even more ideal embodiment with the annular groove 25 located towards the end of the nut body 20 with the radial flange 30. In such an ideal embodiment, the locking T-nut 10 may also optionally include an annular lip 28 extending radially inward from the end of the nut body 20 with the radial flange 30 towards the longitudinal axis 26 of the nut body. The annular lip 28 is designed for helping hold the locking ring 42 within the annular groove 25 located towards the end of the nut body with the radial flange 30. Ideally, as an option to be used with or without the presence of the annular lip 28, the annular groove 25 may be tapered radially and inwardly towards the end of the nut body 20 with the radial flange 30.

Figure 6:
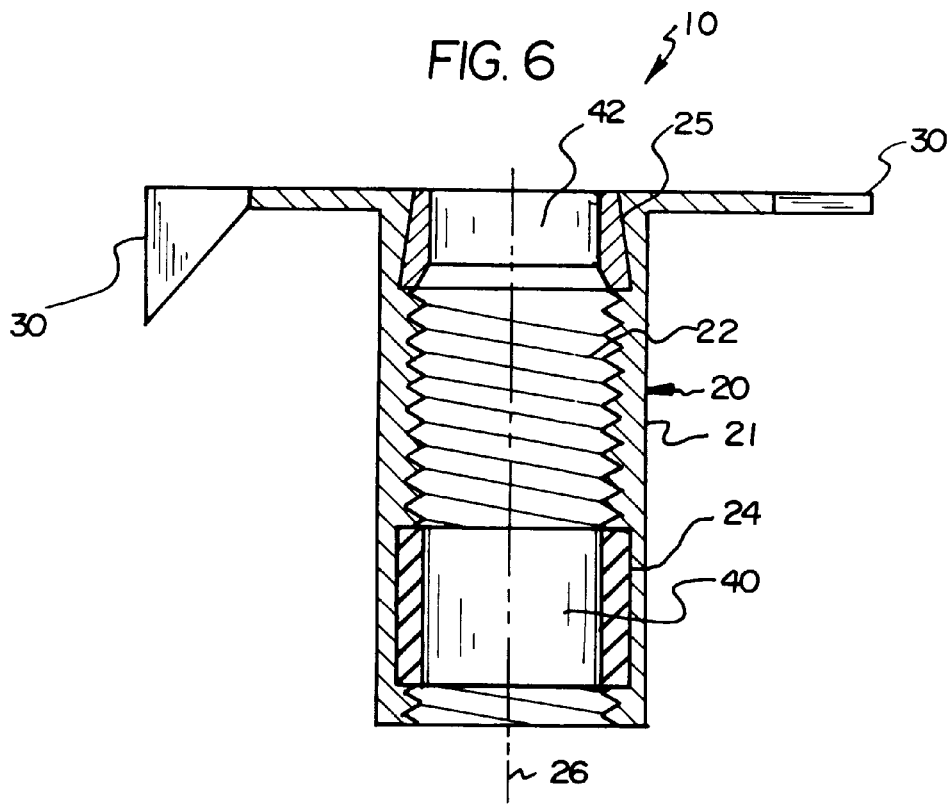
FIG. 6 is a cross sectional view of an embodiment of the locking T-nut with two locking rings with a tapered annular groove positioned towards the end of the nut body with the radial flange.

Also ideally, as shown in FIG. 6, the locking T-nut 10 may include both an annular groove 24 and a locking ring 40 located towards the end of the nut body 20 without the radial flange 30 and an annular groove 25 and a locking ring 42 located towards the end of the nut body 20 with the radial flange 30.

The locking rings 40,42 are preferably made of a resilient material such as a plastic, like a nylon resin, adapted to provide a means for helping securely hold a threaded element 1 within the threaded bore 22. The locking rings 40,42 should not, preferably, extend radially too far into the bore 22 towards the longitudinal axis 26 to prevent the locking T-nut 10 from being threaded onto a suitably sized threaded element 1 for the bore 22.

The securing tooth 32 is designed for engaging a structure 2 to help hold the radial flange 30 to the structure 2. Preferably, as shown in FIG. 3, the radial flange 30 includes a plurality of spaced apart securing teeth 32. Even more preferably, the radial flange may also include a plurality of securing holes 36 extending through the radial flange 30 for permitting the extension of fasteners, such as screws or nails, therethrough for helping secure said radial flange 30 to a structure 2.

Optionally, the locking T-nut may include a plurality of spaced apart cleats 34 outwardly extending from the outer surface 21 of the nut body. The cleats 34 are designed for engaging a structure 2 when the nut body 20 is inserted into the structure to help hold the nut body to the structure. The cleats 34 and the securing teeth also help hold the locking T-nut 10 against rotation in relation to a structure.

In use, a hole is made through a structure 1 to permit insertion of the nut body 22 into the hole. The end of the nut body 20 without the radial flange is then inserted into the hole. The locking T-nut is inserted into the hole until the securing teeth 32 are driven into the structure 1. A threaded element 1 may then be inserted into the end of the nut body without the radial flange so that the element engages the threads of the bore 22 and the locking ring or rings 40,42 located within the bore 22. The locking ring or rings 40,42 helps hold the element securely within the bore 22. The securing cleats 34 and the securing teeth 32 help securely hold the locking T-nut to the structure so that forces applied to the locking T-nut 10 from the element do not easily remove or loosen the locking T-nut 10 from the structure.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A locking T-nut, comprising:

a cylindrical nut body having opposite first and second ends, an longitudinal axis, an outer surface, and an interior surface, said longitudinal axis being extended through said nut body between said first and second ends;

said interior surface of said nut body defining a threaded bore adapted to receive a threaded element, said bore being extended through said nut body along said longitudinal axis through said opposite ends;

said interior surface of said nut body having a first annular groove for receiving a locking ring therein, said first annular groove opening into said bore of said nut body, said first annular groove being located towards said second end of said nut body;

a first resilient locking ring being mounted within said first annular groove, said first locking ring being in coaxial alignment with said bore;

said interior surface of said nut body having a second annular groove for receiving a locking ring therein, said second annular groove opening into said bore of said nut body, said second annular groove being located towards said first end of said nut body;

a second resilient locking ring being mounted within said second annular groove, said second locking ring being in coaxial alignment with said bore and having an annular flange coupled about a periphery of an end thereof and extending radially therefrom;

a radial flange being radially extended from said first end of said nut body;

a plurality of spaced apart securing teeth being extended from said radial flange towards said second end of said nut body, said securing teeth being for engaging a structure to help hold said radial flange to the structure;

a plurality of spaced apart cleats being outwardly extended from said outer surface of said nut body, said cleats being for engaging a structure to help hold said nut body to the structure;

said radial flange having a plurality of securing holes extending therethrough, said securing holes being for permitting the extension of fasteners therethrough for helping secure said radial flange to a structure; and an annular lip being extended radially inward from said first end of said nut body towards said longitudinal axis of said nut body, said annular lip being for helping hold said annular flange of said second locking ring within said second annular groove.

2. The locking T-nut as set forth in claim 1, wherein said annular lip is coupled to said nut body and is raised with respect to said radial flange and has an arcuate cross-section.

3. The locking T-nut as set forth in claim 1, wherein said securing teeth each have a substantially planar configuration and reside within a plane which includes said longitudinal axis of said nut body.

4. The locking T-nut as set forth in claim 3, wherein said radial flange has a substantially triangular cut out formed therein adjacent each of said securing teeth.

5. The locking T-nut as set forth in claim 3, wherein said securing teeth include a first pair of teeth each having a height which decreases toward said nut body and a second pair of teeth each having a height which increases toward said nut body.

6. The locking T-nut as set forth in claim 1, wherein an inner surface of the second resilient locking ring has an inboard portion tapering toward said first end of said nut body and an outboard portion with a substantially right cylindrical configuration.

7. The locking T-nut as set forth in claim 1, wherein said cleats each have a substantially prism-shaped configuration, wherein at least one cleat resides parallel with said longitudinal axis and at least one cleat resides in perpendicular relationship with said longitudinal axis.

8. A locking T-nut, comprising:

a cylindrical nut body having opposite first and second ends, an longitudinal axis, an outer surface, and an interior surface, said longitudinal axis being extended through said nut body between said first and second ends;

said interior surface of said nut body defining a threaded bore adapted to receive a threaded element, said bore being extended through said nut body along said longitudinal axis through said opposite ends;

said interior surface of said nut body having a first annular groove for receiving a locking ring therein, said first annular groove opening into said bore of said nut body, said first annular groove being located towards said second end of said nut body;

a first resilient locking ring being mounted within said first annular groove, said first locking ring being in coaxial alignment with said bore;

said interior surface of said nut body having a second annular groove for receiving a locking ring therein, said second annular groove opening into said bore of said nut body, said second annular groove being located towards said first end of said nut body;

a second resilient locking ring being mounted within said second annular groove, said second locking ring being in coaxial alignment with said bore and having an annular flange coupled about a periphery of a end thereof and extending radially therefrom;

a radial flange being radially extended from said first end of said nut body;

a plurality of spaced apart securing teeth being extended from said radial flange towards said second end of said nut body, said securing teeth being for engaging a structure to help hold said radial flange to the structure;

a plurality of spaced apart cleats being outwardly extended from said outer surface of said nut body, said cleats being for engaging a structure to help hold said nut body to the structure;

said radial flange having a plurality of securing holes extending therethrough, said securing holes being for permitting the extension of fasteners therethrough for helping secure said radial flange to a structure; and an annular lip being extended radially inward from said first end of said nut body towards said longitudinal axis of said nut body, said annular lip being for helping hold said annular flange of said second locking ring within said second annular groove;

wherein said annular lip is coupled to said nut body and is raised with respect to said radial flange and has an arcuate cross-section;

wherein said securing teeth each have a substantially planar configuration and reside within a plane which includes said longitudinal axis of said nut body;

wherein said radial flange has a substantially triangular cut out formed therein adjacent each of said securing teeth;

wherein said securing teeth include a first pair of teeth each having a height which decreases toward said nut body and a second pair of teeth each having a height which increases toward said nut body;

wherein an inner surface of the second resilient locking ring has an inboard portion tapering toward said first end of said nut body and an outboard portion with a substantially right cylindrical configuration;

wherein said cleats each have a substantially prism-shaped configuration, wherein at least one cleat resides parallel with said longitudinal axis and at least one cleat resides in perpendicular relationship with said longitudinal axis.

\* \* \* \* \*